United States Patent Office 3,523,142
Patented Aug. 4, 1970

3,523,142
ALKANE-OLEFIN ALKYLATION WITH GAMMA-ALUMINA CATALYST ACTIVATED WITH CHLORINE OR BROMINE
Li C. Mih, Beacon, and Edward T. Child, Fishkill, N.Y., assignors to Texaco Inc., New York, N.Y., a corporation of Delaware
No Drawing. Filed Nov. 20, 1967, Ser. No. 684,489
Int. Cl. C07c 3/52
U.S. Cl. 260—683.47          9 Claims

ABSTRACT OF THE DISCLOSURE

A process for the alkylation of alkane streams composed of normal or isoparaffins with $C_2$ to $C_6$ olefins by contacting the alkane and olefin with a catalyst composed of gamma-alumina and chlorine or bromine. The catalyst is prepared by contacting gamma-alumina with chlorine or bromine and an organic compound having at least two carbon atoms.

---

This invention relates to the alkylation of paraffins with olefins. In particular, this invention relates to the alkylation of isoparaffins with olefins resulting in an alkylate consisting of a complex mixture of high octane gasoline boiling range products.

The preparation of high octane number blending components for gasolines employing as catalyst either sulfuric or hydrofluoric acid is well known in the art. While processes employing such catalysts have enjoyed commercial success, investigation into alternative processes continue in view of the corrosive nature of the materials presently employed. Although numerous alternatives have been proposed suggesting a variety of catalyst for alkylation, research continues by the art into processes which provide greater selectively towards desired high octane components.

Moreover, in copending application Ser. No. 646,455, filed June 16, 1967, entitled, "Catalyst for Hydrocarbon Conversion," by John H. Esters, Robert M. Suggitt and Stanley Kravitz assigned to the assignee hereof, highly active hydrocarbon conversion catalysts useful for aromatic alkylation are set forth. While these compositions enjoy some utility as paraffin or isoparaffin alkylation catalysts, they nevertheless concomitantly possess exceptionally high cracking and isomerization activity. Such activity, with regards to alkane-olefin alkylation, provides proportionally higher yields of $C_8$ and higher products along with greater amounts of cracked products. For the purpose of providing a route to the preparation of high octane number blending components in high yield and selectivity such catalysts leaves much to be desired.

It is therefore an object of this invention to provide a process for the alkylation of alkanes with olefins.

Another object of this invention is to provide a process for the alkylation of alkanes with olefins in high yields.

Yet another object of this invention is to provide a process for the alkylation of alkanes with olefins having a high selectivity towards high octane number blending components.

Other objects and advantages will become apparent from a reading of the following detailed description and examples.

Broadly, this invention contemplates a process for the alkylation of alkanes with olefins comprising contacting an alkane and an olefin under alkylating conditions with a catalyst comprising gamma-alumina and chlorine or bromine prepared by contacting gamma-alumina with chlorine or bromine and an organic compound having at least two carbon atoms at temperatures between 200 and 800° F.

The instant invention relates to the use of a novel catalyst composition in the alkylation of alkanes with olefins. The catalyst comprises a catalytically active gamma alumina and about 3.0 to about 15.0 weight percent chlorine or bromine. In addition, the catalyst may also contain from about 0.01 to 2.0 weight percent of a metal selected from the group consisting of platinum, palladium, rhodium and ruthenium. Such a catallyst is prepared by employing an organic compound or mixture of organic compounds as activating agents in conjunction with chlorine or bromine. The organic compound comprises at least two atoms of carbon, X atoms of hydrogen, Y atoms of chlorine and/or bromine and may or may not contain oxygen or sulfur. Either X or Y may be zero. The mole ratio of molecular chlorine and/or bromine to the organic compound must be greater than $X-Y/2$ if X is equal to or greater than Y or greater than 0 if X is less than Y. The amount of chlorine or bromine should be greater if the organic compound contains sulfur. Specifically, if there are Z atoms of sulfur in the organic compound the mole ratio of chlorine or bromine (Y) to organic compound should be greater than $X+2Z-Y/2$ if $X+2Z$ is greater than Y or greater than 0 if $X+2Z$ is less than Y.

In particular, organic chlorides are preferred as activating agents. These include, in accordance with this invention, compounds such as sym-tetrachloroethane, tetrachloroethylene, hexachloroethane, pentachloroethane, hexachloroacetone, hexachloro-1,3-butadiene, hexachloropropanone-2, hexachlorocyclopentadiene, hexachloropropylene, trichloroacryloylchloride, trichloroacetyl chloride and chloral. Of the aforementioned compounds we have found that tetrachloroethylene is particularly useful as an organic compound containing chlorine for purposes of activating the gamma-alumina with or without a platinum group metal. Further organic compounds not containing halides can be used in conjunction with sufficient chlorine or bromine, for example ethane and ethylene. The exact mechanism by which the gamma-alumina composite is activated is not precisely understood especially since the process can be performed in the absence of oxygen or an oxygen containing atmosphere.

With respect to the temperature we have found that a temperature of at least 200° F., preferably 450° F., is desirable for preparation of a highly active alkylation catalyst. Temperatures less than 200° F. are generally insufficient to provide an active catalyst useful for commercial size operations. Further, temperatures in excess of 800° F. tend to promote the formation of aluminum chloride or other side products with a loss of any platinum or other metal present and utilized in the catalyst base. We employ a temperature between 200 and 800° F., most preferably between 450 and 650° F.

The catalyst prepared by our invention can be produced in pellet, granular, bead or pulverulent formed to facilitate its use in fixed beds, moving beds or fluidized solid beds as is well known in the art. The catalyst can be prepared in situ in a hydrocarbon conversion reactor by passing a stream of chlorine or bromine through a vessel containing the organic compound. The effluent is charged into a hydrocarbon conversion reactor containing the gamma-alumina catalyst to be activated, maintained at a temperature of between 200 and 800° F. The effluent from the alkylation reactor consists largely of chlorine and/or bromine and saturated chlorocarbons. Excess saturated chlorocarbons can be recycled.

For obvious economic reasons we prefer to employ chlorine together with the multicarbon organic chloride activators. However, in certain circumstances one may prefer to utilize bromine as it is in liquid form at room temperature.

The catalyst prepared in accordance with this invention is highly active at relatively low temperatures. Alkane streams consisting chiefly of n-paraffins or isoparaffins or mixtures thereof are alkylated in the presence of olefins employing our catalyst at temperatures within the range of about room temperature to about 500° F. and preferably within the range of 150 to 250° F. Alkylation can be effected in either the liquid, vapor phase or liquid-vapor phase. Pressures from atmospheric to the practical maximum as limited by materials of construction can be used. Pressures within the range of from atmospheric to 1200 pounds per square inch gage have been found convenient. A liquid hourly space velocity (LHSV), that is the volume of liquid n-paraffin or isoparaffin charged per hour per volume of catalyst, within the range of about 0.5 to 16 and preferably within the range of from about 4 to 8 is suitable for alkylation using the catalyst prepared by our invention. Employing our catalyst, the contemplated alkylation process proceeds by charging an alkane into the reaction zone together with the olefin with a mole ratio of alkane to olefin within the range of about 10:1 to 6:1.

A wide range of alkanes and olefins may be used in the contemplated alkylation process. In general alkanes having from 4 to 10 carbon atoms and preferably from 4 to 8 carbon atoms are employed. Particularly preferred alkanes are the iso-paraffins having from 4 to 8 carbon atoms. Of the olefins we employ those having from 2 to 6 carbon atoms and preferably those having from 2 to 4 carbon atoms. Among the alkanes suitable in the instant alkylation process we mention n-butane, n-pentane, n-heptane, n-octane, n-nonane, n-decane, isobutane, isopentane, isohexane and isoheptane, preferably isobutane and isopentane. Applicable olefins include ethylene, propylene, butene-1 and -2 and amylene, preferably ethylene and propylene. Highly preferred alkylations include the reaction of ethylene with isobutane to form 2,3-dimethylbutane, the reaction of propylene and isobutane or ethylene and isopentane to form 2,2,3-trimethylbutane and the reactions of isopentylene and isobutane or isobutylene and propylene and isohexanes to form 2,2,3,3-tetramethylpentane. Illustrations of other high octane blending components which we mention prepared according to the instant process include 2,2-dimethylpentane, 2,3-dimethylpentane, 2,2,4-trimethylpentane, 2,2,3-trimethylpentane, 2,3,4-trimethylpentane, 2,3,3-trimethylpentane and 3,3,5-trimethylheptane. The alkylate may consist of a complex mixture of isoparaffins of the type mentioned above, as for example, from the alkylation of isobutane or isopentane with ethylene, propylene, butene and isobutylene. The alkane and olefin feed stocks moreover, may be composed of mixtures of alkanes and isoalkanes and the olefin feed stock may be a mixture of, for example, ethylene and propylene, or ethylene and butene-1.

In order to more fully illustrate the nature of our invention and manner of practicing the same the following examples are presented.

EXAMPLE 1

The alkylation catalyst employed in Experiment A was prepared by calcining 100 grams of gamma-alumina at 1,050° F. for 4 hours and promoted with a 1:1 mole ratio of tetrachloroethylene and chlorine at the rate of 1.3 cc. per hour of tetrachloroethylene in an air stream of 4 cubic feet per hour at 550° F. for 24 hours. The gamma-alumina catalyst employed in Experiment B was prepared by recalcining 100 grams of the unstabilized gamma-alumina catalyst in a hydrogen stream of 5 cubic feet per hour at 800° F. for 4 hours and treating with HCl gas at 0.5 cubic feet per hour in a nitrogen atmosphere of 0.5 cubic feet per hour at 500° F. for 2 hours. The eta-alumina catalyst employed in Experiment C was prepared in the manner described for the catalyst used in Experiment A but was calcined at a temperature of 1050° F. for 3 hours and promoted with a 1:1 mole ratio of tetrachloroethylene and chlorine at the rate of 1.3 cc. per hour of tetrachloroethylene in a stream 4 cubic feet per hour of nitrogen at 550° F. for 24 hours. The eta-alumina catalyst employed in Experiment D was prepared substantially in the manner described for the catalyst utilized in Experiment B.

The following alkylations were performed by charging ethylene and isobutane into reactors containing each of the catalysts prepared above. The alkylations were conducted over a period of 9 to 16 hours at pressures of 800 p.s.i.g. and temperature of 200° F. Feedstocks of isobutane and ethylene were fed through the reactor and the effluent debutanized, that is, the overhead $C_2$ to $C_4$ removed from the liquid product. The $C_5$ and higher fractions, containing a small percentage of $C_4$, were accumulated over a period of 9 to 16 hours. The results of the four experiments are summarized in the table below.

TABLE 1

|  | A | B | C | D |
|---|---|---|---|---|
| Pressures, p.s.i.g. | 800 | 800 | 800 | 800 |
| Temp., °F | 200 | 201 | 200 | 200 |
| LHSV (on isobutane) | 7.2 | 7.6 | 6.7 | 7.5 |
| Feed Analysis, Mol Percent: |  |  |  |  |
| Isobutane | 94.4 | 92.0 | 92.0 | 92.0 |
| Ethylene | 5.3 | 7.2 | 7.2 | 7.2 |
| Propane | 0.3 | 0.8 | 0.8 | 0.8 |
| Stabilized Alkylate: |  |  |  |  |
| Isobutane | 7.3 | 13.3 | 10.8 | 12.2 |
| Normal butane | 0.1 | 0.2 | 1.1 | 0.3 |
| Isopentane | 0.3 (0.3) | 0.9 (1.0) | 15.5 (17.6) | 4.3 (4.9) |
| Normal pentane |  |  | 3.7 (4.2) | 0.4 (0.4) |
| 2,2-dimethylbutane | 0.5 (0.5) | 1.1 (1.3) | 9.9 (11.2) | 5.2 (5.9) |
| Do. | 58.2 (62.8) | 52.9 (61.2) | 16.1 (18.3) | 36.7 (41.9) |
| 2-methylpentane | 5.9 (6.4) | 4.9 (5.6) | 13.7 (15.5) | 12.4 (14.3) |
| 3-methylpentane | 4.9 (5.3) | 2.6 (3.0) | 6.5 (7.4) | 4.7 (5.4) |
| n-Hexane |  | 0.1 (0.1) | 2.3 (2.6) | 0.8 (0.9) |
| $C_6+$ | 22.8 (24.6) | 24.0 (27.7) | 20.4 (23.0) | 23.0 (26.2) |

The data in parentheses are the weight percent on a $C_4$ free basis.

As can be seen from Table 1, gamma-alumina catalysts prepared according to the instant invention possess a greater selectivity toward the higher octane components, in this instance 2,3-dimethylbutane. As can be seen from the table eta-alumina catalysts possess excessive cracking and isomerization activity as evidenced by the higher proportion of cracked products such as pentanes.

EXAMPLE 2

In a manner similar to Example 1, a feed consisting of isobutane (94.96%), ethylene (4.72%) and propane 0.32% was contacted with a gamma-alumina catalyst (E) and an eta-alumina catalyst (F) activated with tetrachloroethylene and chlorine at 800 p.s.i.g. at 200° F. at a liquid hourly space velocity of 1.05. The alkylate products summarized in the table below gave the following composition.

TABLE 2

| Stabilized Alkylate | E | F |
|---|---|---|
| Isobutane | 12.2 | 0.5 |
| Normal pentane | | 1.0 |
| Isopentane | 1.5 | 4.8 |
| 2,2-dimethylbutane | 0.3 | 1.5 |
| Do. | 49.0 | 23.7 |
| 2-methylpentane | 7.5 | 13.6 |
| 3-methylpentane | 3.7 | 5.7 |
| n-Hexane | | 1.0 |
| $C_6+$ | 26.2 | 48.2 |

We claim:

1. A process for the catalytic alkylation of alkanes with olefins comprising contacting an alkane having from 4 to 10 carbon atoms and an olefin having from 2 to 6 carbon atoms, the mole ratio of said alkane to said olefin ranging from about 10:1 to 6:1, at a temperature of from room temperature to 500° F. with a catalyst comprising gamma-alumina and about 3.0 to about 15.0 weight percent chlorine or bromine prepared by contacting gamma-alumina at temperatures between 200 and 800° F. with (1) molecular chlorine or bromine and (2) an organic compound selected from the group consisting of sym-tetrachloroethane, tetrachloroethylene, hexachloroethane, pentachloroethane, hexachloroacetone, hexachloro-1,3-butadiene, hexachloropropanone-2, hexachlorocyclopentadiene, hexachloropropylene, trichloroacryloylchloride, trichloroacetyl chloride, chloral, ethane and ethylene, wherein the mole ratio of said molecular chlorine or bromine to said organic compound is greater than $X-Y/2$ if X is equal to or greater than Y, or wherein the mole ratio of said molecular chlorine or bromine to said organic compound is greater than 0 if X is less than Y, where X corresponds to the number of hydrogen atoms in said organic compound and Y corresponds to the number of chlorine atoms in said organic compound.

2. A process according to claim 1 wherein said gamma-alumina is contacted at a temperature within the range of 450 to 650° F.

3. A process according to claim 1 wherein said gamma-alumina is contacted with chlorine.

4. A process according to claim 1 wherein said gamma-alumina is contacted with bromine.

5. A process according to claim 1 wherein said organic compound is tetrachloroethylene.

6. A process according to claim 1 wherein said alkylation is conducted at a pressure of from atmospheric to 1200 p.s.i.g.

7. A process according to claim 1 wherein said alkylation is conducted at a liquid hourly space velocity within the range of 0.5 to 16 volumes of liquid alkane per volume of catalyst.

8. A process according to claim 1 wherein said alkane is an isoparaffin having from 4 to 8 carbon atoms and said olefin has from 2 to 14 carbon atoms.

9. A process according to claim 1 wherein said alkane is isobutane and where said olefin is ethylene.

References Cited

UNITED STATES PATENTS

| 3,239,577 | 3/1966 | Bloch et al. | 260—683.47 |
| 3,240,840 | 3/1966 | Goble et al. | 260—683.47 |
| 3,031,419 | 4/1962 | Hoekstra | 252—441 |
| 3,242,229 | 3/1966 | Estes | 260—683.47 |

DELBERT E. GANTZ, Primary Examiner

G. J. CRASANAKIS, Assistant Examiner

U.S. Cl. X.R.

252—442

PO-1050
(5/69)

UNITED STATES PATENT OFFICE
CERTIFICATE OF CORRECTION

Patent No. 3,523,142      Dated August 4, 1970

Inventor(s) Li C. Mih and Edward T. Child

It is certified that error appears in the above-identified patent and that said Letters Patent are hereby corrected as shown below:

Column 1, line 52, "leaves" should read --leave--.

Column 2, line 7, "catallyst" should read --catalyst--.

Column 2, line 22, after "X+2Z is" and before "greater" insert --equal or--. Column 4, Table 1, "Do." should read --2,3-dimethylbutane--. Column 5, Table 2, "Do." should read --2,3-dimethylbutane--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents